US006800856B2

(12) United States Patent
Bruns

(10) Patent No.: US 6,800,856 B2
(45) Date of Patent: Oct. 5, 2004

(54) LIGHT SAMPLING SYSTEM

(75) Inventor: Donald Bruns, San Diego, CA (US)

(73) Assignee: Trey Enterprises Corp., San Diego, CA (US)

( * ) Notice: Subject to any disclaimer, the term of this patent is extended or adjusted under 35 U.S.C. 154(b) by 180 days.

(21) Appl. No.: 09/960,267

(22) Filed: Sep. 20, 2001

(65) Prior Publication Data

US 2003/0052274 A1 Mar. 20, 2003

(51) Int. Cl.$^7$ .............................................. G01N 21/27
(52) U.S. Cl. .................................... 250/351; 250/458.1
(58) Field of Search .............................. 250/351, 458.1, 250/559.03, 559.05, 358.1, 330, 341.1; 356/317, 318, 417

(56) References Cited

U.S. PATENT DOCUMENTS

| | | | | |
|---|---|---|---|---|
| 4,045,670 A | * | 8/1977 | Anderson et al. ............ 374/129 |
| 5,389,788 A | * | 2/1995 | Grinberg et al. ............. 250/331 |
| 5,440,114 A | * | 8/1995 | Barbier et al. ............ 250/206.2 |
| 5,465,284 A | * | 11/1995 | Karellas ........................ 378/62 |
| 5,642,125 A | * | 6/1997 | Silverstein et al. ............ 345/87 |
| 5,710,429 A | * | 1/1998 | Alfano et al. ............. 250/358.1 |
| 5,805,243 A | * | 9/1998 | Hatano et al. .................. 349/5 |
| 5,864,146 A | * | 1/1999 | Karellas ....................... 250/581 |
| 6,201,559 B1 | * | 3/2001 | Wada et al. ................. 347/236 |
| 6,377,346 B1 | * | 4/2002 | Vaisala et al. ............... 356/417 |

* cited by examiner

Primary Examiner—Constantine Hannaher
Assistant Examiner—Otilia Gabor
(74) Attorney, Agent, or Firm—Gary Eastman

(57) ABSTRACT

A light sampling system for sampling scattered light from mirrors in an optical switch. The system includes four basic components: an imaging lens, a multi-channel liquid crystal light valve (LCLV), a collecting lens, and a light sensor. Light scattered by each mirror, is collected by the imaging lens, which re-images the light onto the LCLV. The LCLV is divided into multiple regions, one for each mirror to be monitored. Each region can independently be made opaque ("closed") or transparent ("open") to light reaching it. Light passing through all open regions of the LCLV is collected by the collecting lens, which focuses the light onto the light sensor. The light sensor registers a response to light passing through the LCLV. Each region of the LCLV can be programmed to be open or closed for any length of time, in any combination or sequence with any other region or regions, depending upon how the user wishes to monitor the scattered light. The system is particularly useful for individually sampling scattered light from each of multiple mirrors.

1 Claim, 1 Drawing Sheet

LIGHT SAMPLING SYSTEM

FIELD OF THE INVENTION

The present invention relates broadly to telecommunications equipment. More particularly, the present invention is useful in the fiber-optic segment of the telecommunications industry as a device for monitoring scattered light in an optical switch.

BACKGROUND OF THE INVENTION

Over the past several decades, the telecommunications industry has exploded, and the incorporation of optical fiber into this industry is revolutionizing the way information is transmitted. Communication systems which use optical fiber as the transmission media offer some significant advantages over past wire-based systems, such as higher bandwidths and transmission rates, lower transmission losses, lower implementation costs, and greater electrical isolation.

In a fiber-optic communications system, communications signals are carried by light beams transmitted through the optical fibers. These light beams are generally infrared (IR) light beams, because IR light is less attenuated in optical fibers than other types of light. To connect users of these systems, light beams must be switched from one fiber to another. Such switching is typically accomplished using an optical cross-connect, or optical switch. Optical switches typically switch multiple light beams simultaneously. Each light beam is switched from any of multiple input fibers to any of multiple output fibers. To accomplish this switching, these switches incorporate optical elements such as mirrors, prisms, fiber collimators, and complicated drive mechanisms. In a switch that incorporates mirrors to do the switching, for example, each mirror can be tilted to reflect a light beam from an input fiber to any of one of several output fibers. Each light beam to be switched requires a separate mirror, or beam directing element.

A problem in fiber-optic communications systems is loss of part or all of a light beam that carries a signal. This is a problem because when part or all of a light beam is lost, the signal carried by it is also degraded or lost. Such loss can be due in part to a variety of causes. For instance, a user can lose light upstream due to fiber breaks, or a bad connection, a bd laser, or a bad switch. In optical switches that incorporate mirrors, for example, while most of a light beam may be reflected in the desired direction, part may be scattered due to imperfections in the mirror.

Some users of optical switches desire to monitor scattered light in optical switches. More particularly, some users desire to monitor the light scattered from each of multiple optical elements (e.g., mirrors) in an optical switch. Consequently, there is a need for a system to monitor scattered light in an optical switch.

One way to do this is to provide a detector sensitive to such light, situated so that it receives scattered light from one or more optical elements. A problem with this solution is that, if the detector is used with multiple elements, the detector cannot discern from which element or elements any scattered light might have come; the detector only detects the aggregate of light entering it from all sources in its view. If a camera is used with a lens focussed on the region of interest, it can determine the source, however, such a camera is expensive.

Accordingly, it is an object of the present invention to provide a relatively simple and inexpensive system to monitor light scattered by any one or more of one or more optical elements in an optical switch.

SUMMARY OF THE PRESENT INVENTION

The Light Sampling System of the present invention includes four (4) basic components, including an imaging lens, a multi-channel liquid crystal light valve (LCLV), a collecting lens, and a light sensor. Light scattered by each of one or more optical elements, is collected by the imaging lens, which re-images the light onto the LCLV. The LCLV is divided into multiple regions, one for each optical element to be monitored. Each region can independently be made opaque ("closed") or transparent ("open") to light reaching it. Light passing through all open regions of the LCLV is collected by the collecting lens, which focuses the light onto the light sensor. If light is passing through the LCLV, then the light sensor will register a response. Each region of the LCLV can be programmed to be open or closed for any length of time, in any combination or sequence with any other region or regions, depending on how the user wishes to monitor the light scattered by the optical elements.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION

Figure 1:
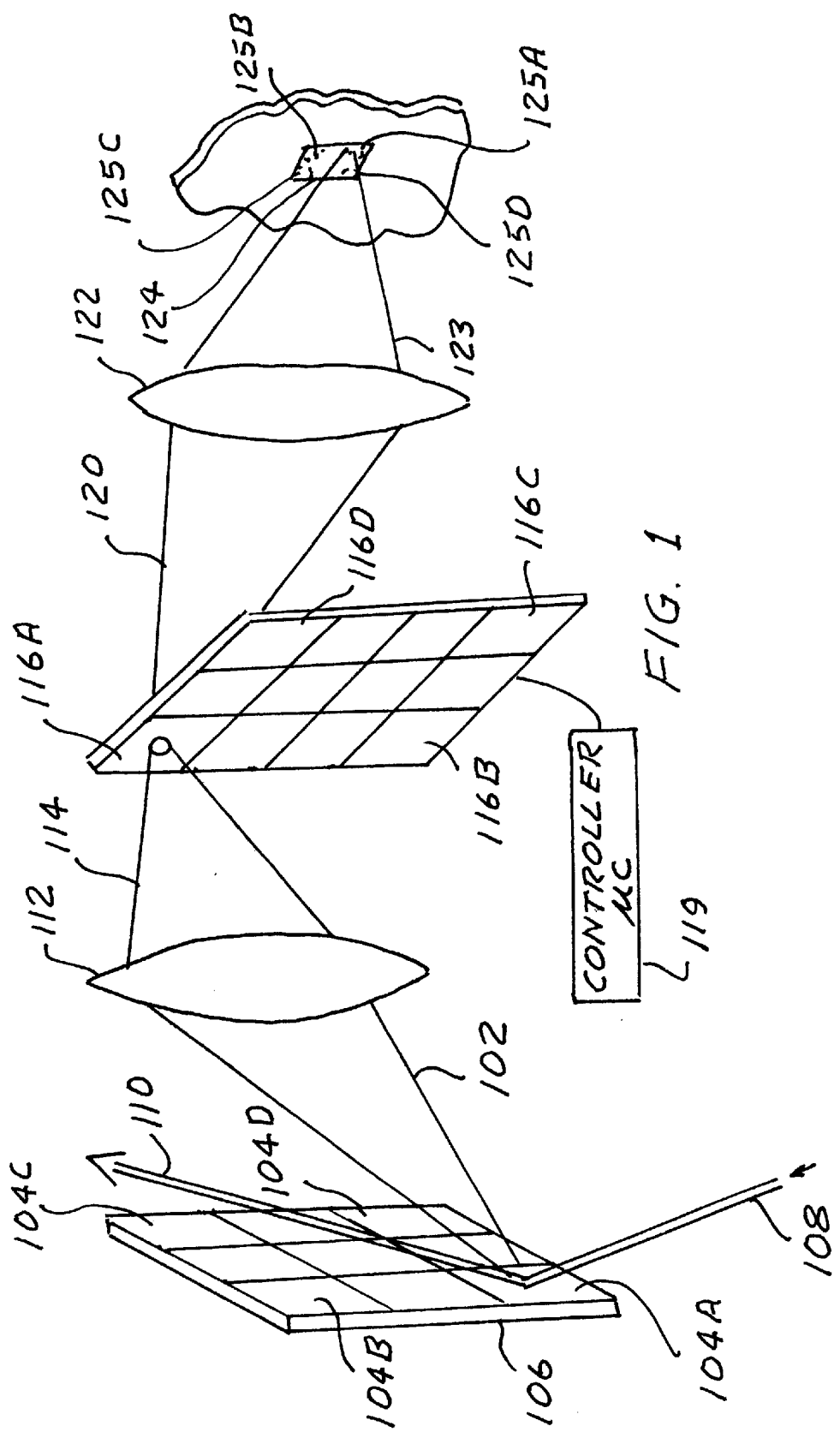
FIG. 1 is a schematic view of a preferred embodiment of the present invention showing an imaging lens in relation to light that has been scattered by an optical element or elements and is to be detected.

Referring initially to FIG. 1, a schematic view of a preferred embodiment of the Light Sampling System of the present invention is shown and generally designated 100. FIG. 1 shows a scattered light 102 which has been scattered by imperfections in a mirror 104 in an array 106 of mirrors 104 in an optical switch. An incoming beam 108 strikes mirror 104 and is mostly reflected as a reflected beam 110. However, part of incoming beam 108 is scattered as scattered light 102, which is collected by imaging lens 112. Imaging lens 112 focuses scattered light 102 into an imaged light 114. Imaged light 114 then arrives at a region 116 of a liquid crystal light valve (LCLV) 118.

LCLV 118 is divided into multiple regions 116, one for each mirror 104. Each region 116 can independently be made opaque ("closed") or transparent ("open") to imaged light 114 reaching it. If imaged light 114 arrives at its corresponding region 116, and that region 116 is open, then imaged light 114 passes through that region 116 and exits it on the other side of LCLV 118 as a sampled light 120. This may also be called "gating" a light signal.

Sampled light 120 from all open regions 116 is collected by a collecting lens 122. Collecting lens 122 focuses the sampled light 120 onto a light sensor 124. Light sensor 124 may be an IR sensor. If any sampled light 120 is emitting from any region or regions 116 of LCLV 118, then sensor 124 will register a response.

Each region 116 of LCLV 118 can be controlled or programmed to be open or closed for any length of time, in any combination or sequence with any other region or regions 116, depending upon how the user wishes to monitor scattered light 102 from mirrors 104. For example, each region 116 can be opened momentarily, one at a time in a predetermined sequence as determined by controller 119, to sample scattered light 102 from each mirror 104 in sequence. Such sampling can be done continuously. Another option is that only a certain region or regions 116 can be kept open continuously to monitor scattered light 102 from only the corresponding mirror or mirrors 104.

While the present invention does not simultaneously monitor every mirror 104 individually, an overriding advantage of the present invention is that it is simpler and less expensive than using cameras.

In a preferred embodiment of the present invention, incoming beam 108 may be infrared (IR) light. However, this is not to be construed as a limitation on the present invention, but only as an illustration of preferred embodiments of the present invention. It will be appreciated by persons skilled in the art that the present invention may be used with any type of electromagnetic radiation, including but not limited to ultraviolet light or visible light.

While the present invention has been described in conjunction with a light sensor 124 as an IR sensor, it is to be appreciated that the present invention can be used with any type of sensor or detector that will detect the type of radiation with which the present invention may be used.

While the present invention has been described in conjunction with lenses as imaging lens 112 and collecting lens 122, it is to be appreciated that the present invention can be used with any elements that will direct the type of radiation with which the present invention may be used, which elements includes but are not limited to refractors, reflectors, mirrors, prisms, waveguides, etc.

While the present invention has been described in conjunction with light scattering elements as mirrors, it is to be appreciated that the present invention can be used with any type of optical elements, including but not limited to lenses, prisms, etc.

While the present invention has been described in conjunction with an optical switch, it is to be appreciated that the present invention can be used with any type of system containing optical elements.

While the present invention has been described in conjunction with a liquid crystal light valve (LCLV) 118, alternatives include any mechanism capable of selectively interrupting the passage of light, and may include but not be limited to shutters, electrically polarized lenses, etc.

As shown in FIG. 1, the array 106 of mirrors 104 has a number of mirrors. For the purposes of this discussion, each of the four mirrors 104 on the corners of array 106 have been designated 104A, 104B, 104C, and 104D. Similarly, LCLV 118 is shown with a corresponding number of light valve segments 116, with the corner segments designated 116A, 116B, 116C, and 116D. Also, detector 124 is shown to have a panel with portions designated 125A, 125B, 125C, and 125D. In use of the present invention, the inverting aspects of lenses 112 and 122 are clearly exhibited.

For instance, as incoming light beam 108 strikes the lower left mirror element 104A, a portion of the light is scattered in diverging beam 102. This diverging light 102 is focussed onto LCLV segment 116A, which is located on the upper right portion of the LCLV 118. If the LCLV segment 116A is on, then light passes through LCLV 118 forming beam 120 which passes through collecting lens 122 to be focussed on the lower right portion 125A of sensor 124. In a similar manner, light from mirror elements 104B, C, and D pass through LCLV elements 116B, C, and D, respectively, and on to sensor portions 125B, C, and D.

While the methods and apparatus for the Light Sampling System of the present invention as herein shown and disclosed in detail is fully capable of obtaining the objects and providing the advantages herein before stated, it is to be understood that it is merely illustrative of preferred embodiments of the invention and that no limitations are intended to the details of the method, construction or design herein shown other than as described in the appended claims.

I claim:

1. A system for sampling communication beams in a fiber optic switch having a beam control mirror array defining a plurality of beam control mirrors, said system comprising:
   A) a multi-region liquid crystal light valve, defining a plurality of individually controlled regions with each region corresponding to one of said beam control mirrors in said beam control mirror array,
   B) an imaging lens positioned to image light scattered from each beam control mirror, in said beam control mirror array, on to its corresponding region in said multi-region liquid crystal light valve,
   C) a liquid crystal light valve control means for making transparent, one-at-a-time, regions of said multi-region liquid light crystal valve,
   D) an infrared light detector, and
   E) a collecting lens positioned to focus, on to said infrared light detector, light scattered from said plurality of beam control mirrors and passing through said liquid crystal light valve, wherein, communication beams passing through said fiber optic switch can be sampled one-at-a-time by opening single regions of said liquid crystal light valve and checking to determine if light scattered from a particular mirror is detected by said infrared light detector.

* * * * *